(12) United States Patent
Jude et al.

(10) Patent No.: US 12,333,170 B2
(45) Date of Patent: Jun. 17, 2025

(54) TIERED STORAGE

(71) Applicant: Klara Systems, Hamilton (CA)

(72) Inventors: Allan Charles Wyatt Jude, Hamilton (CA); Sabina Munteanu, Tielt-Winge (BE)

(73) Assignee: Klara Systems, Hamilton (CA)

( * ) Notice: Subject to any disclaimer, the term of this patent is extended or adjusted under 35 U.S.C. 154(b) by 0 days.

(21) Appl. No.: 17/178,213

(22) Filed: Feb. 17, 2021

(65) Prior Publication Data

US 2022/0261152 A1  Aug. 18, 2022

(51) Int. Cl.
*G06F 3/06* (2006.01)

(52) U.S. Cl.
CPC .......... *G06F 3/064* (2013.01); *G06F 3/0604* (2013.01); *G06F 3/0647* (2013.01); *G06F 3/0653* (2013.01); *G06F 3/0659* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 8,433,848 | B1 * | 4/2013 | Naamad | G06F 3/0605 |
| | | | | 711/114 |
| 10,534,566 | B1 | 1/2020 | Bk et al. | |
| 10,642,505 | B1 * | 5/2020 | Kuzmin | G06F 3/0679 |
| 10,817,203 | B1 * | 10/2020 | Anand | G06F 3/0647 |
| 2007/0083482 | A1 * | 4/2007 | Rathi | G06F 16/185 |
| 2011/0106863 | A1 * | 5/2011 | Mamidi | G06F 16/185 |
| | | | | 707/823 |
| 2011/0202732 | A1 * | 8/2011 | Montgomery | G06F 3/061 |
| | | | | 711/E12.001 |
| 2012/0278511 | A1 * | 11/2012 | Alatorre | G06F 3/0605 |
| | | | | 710/33 |
| 2014/0082288 | A1 * | 3/2014 | Beard | G06F 16/172 |
| | | | | 711/123 |
| 2015/0106578 | A1 * | 4/2015 | Warfield | G06F 3/0653 |
| | | | | 711/158 |
| 2017/0024161 | A1 * | 1/2017 | Katiyar | G06F 3/0689 |
| 2018/0217784 | A1 * | 8/2018 | Aronovich | G06F 3/067 |
| 2020/0133834 | A1 * | 4/2020 | Muchherla | G06F 3/0646 |

OTHER PUBLICATIONS

"EMC Unity: Fast Technology Overview", Dell Inc. White Paper, Dec. 2016.
Storagefreak—storage & cloud blog website "EMC VNX—Fast VP explained" https://www.storagefreak.net/2014/06/emc-vnx-fast-vp-explained Jun. 2, 2014.

* cited by examiner

*Primary Examiner* — Jared I Rutz
*Assistant Examiner* — Alexander J Yoon
(74) *Attorney, Agent, or Firm* — Buchalter; Jason W. Croft

(57) ABSTRACT

A method to store data in tiered storage includes receiving for data stores to be stored on the tiered storage. The tiered storage may include multiple storage tiers, each storage tier having a different performance level. Each policy defines a default storage tier for the corresponding data store that has the policy. The method includes storing the data stores on the tiered storage as blocks. Each of the blocks is stored to a corresponding one of the storage tiers based at least on the policy of the data store to which the block belongs.

18 Claims, 10 Drawing Sheets

TIERED STORAGE

FIELD

The embodiments discussed herein are related to tiered storage in an information processing system.

BACKGROUND

Unless otherwise indicated herein, the materials described herein are not prior art to the claims in the present application and are not admitted to be prior art by inclusion in this section.

Storage systems that are part of information processing systems often include multiple storage tiers, with different ones of the storage tiers providing different levels of input-output (IO) performance or other characteristics. In such systems, data may be moved from one tier to another within a given storage system based on access frequency of the data or other factors.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method to store data in a tiered storage includes receiving policies for data stores to be stored on the tiered storage. The tiered storage includes multiple storage tiers, each storage tier having a different performance level. Each policy defines a default storage tier for the corresponding data store that has the policy. The method includes storing the data stores on the tiered storage as blocks. Each of the blocks is stored to a corresponding one of the storage tiers based at least on the policy of the data store to which the block belongs.

In another example embodiment, a method to retier data in a tiered storage includes storing data stores on the tiered storage as blocks according to policies. The tiered storage includes multiple storage tiers each having a different performance level. Each policy defines a default storage tier for the corresponding data store that has the policy. The method includes generating statistics of at least some of the blocks, the statistics of each block including at least one of a last access time or activity level of the block. The method includes moving a first block of the at least some of the blocks between storage tiers based on at least one of the statistics of the first block or a first policy of a first data store to which the first block belongs.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

Figure 1:
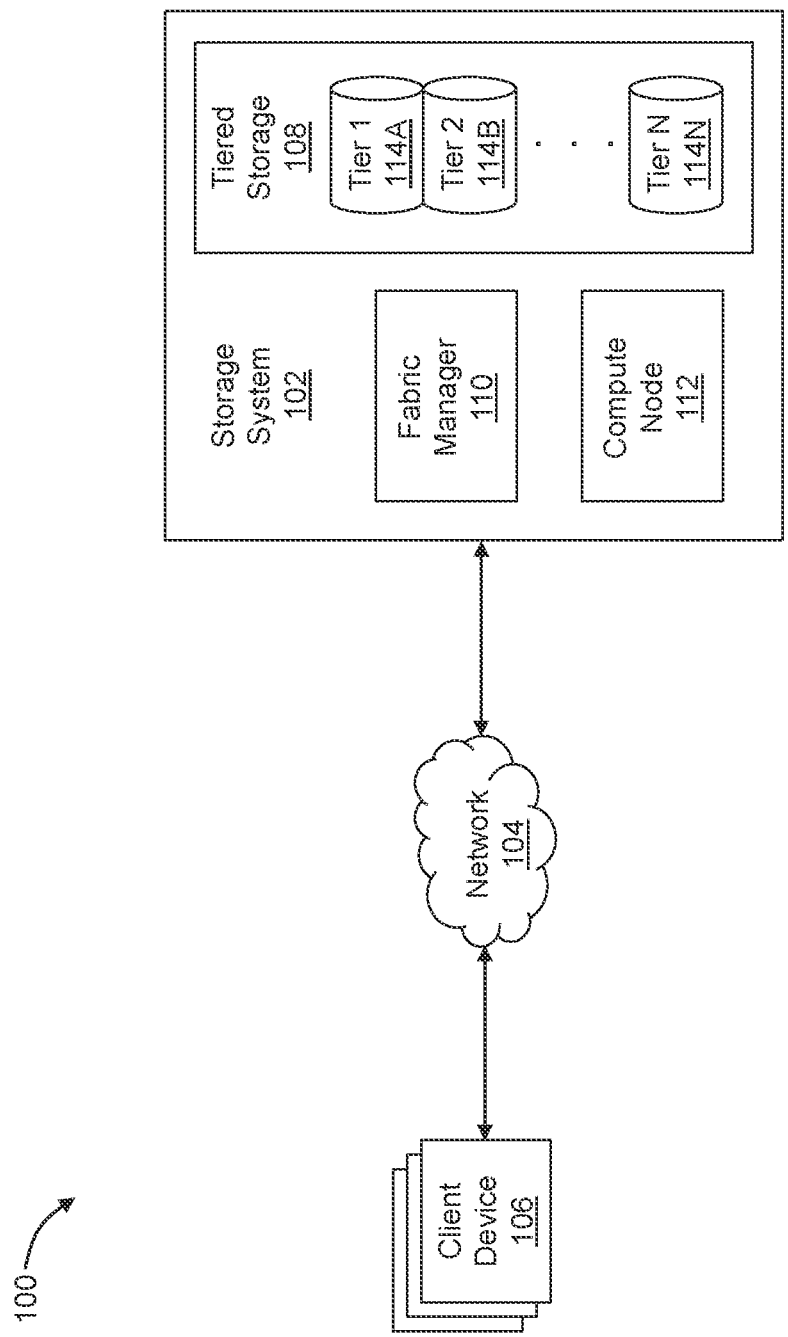
FIG. 1 is a block diagram of an example operating environment that includes a storage system, a network, and one or more client devices.

all arranged in accordance with at least one embodiment described herein.

DETAILED DESCRIPTION OF SOME EXAMPLE EMBODIMENTS

Some embodiments will be described herein with reference to example information processing systems, computing systems, data storage systems, tiered storage systems, and associated servers, computers, storage units and devices and other processing devices. It is to be appreciated, however, that embodiments herein are not restricted to use with the particular illustrative system and device configurations shown. Moreover, the phrases "information processing system," "computing system," "data storage system" and "tiered storage system" as used herein are intended to be broadly construed, so as to encompass, for example, on premises storage systems, cloud computing or storage systems, as well as other types of systems that include distributed virtual and/or physical infrastructure that may be located remote from or local to devices that read from or write to storage. However, a given embodiment may more generally include any arrangement of one or more processing devices.

An information processing system may include, for example, a cloud infrastructure hosting multiple tenants that share cloud resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may include, for example, a business or any other entity, group, or organization. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds). Some information processing systems include or are coupled to tiered storage that has multiple storage tiers. Each tier typically has a different performance level and cost; tiers with better or higher performance, e.g., higher input-output operations per second (IOPS), typically cost more than tiers with worse or lower performance. In view of the cost-performance relationship, enterprises and other entities that use tiered storage often distribute their data across the storage tiers depending on access frequency of the data or other factor(s), e.g., frequently accessed data may be stored in a higher performance storage tier while infrequently accessed data may be stored in a lower performance storage tier.

Within the tiered storage, data may be moved from one storage tier to another as a manual or automated process, often referred to as retiering. In manual retiering, a storage administrator monitors storage workloads periodically and moves data between storage tiers. Manual retiering may be complex and/or time-consuming. In automated retiering, storage workloads may be monitored and data may be moved between tiers based on the monitored storage workloads. Some automated retiering algorithms are performed periodically, such as not more than once every hour, on relatively large sets of data, such as data slices of 256 megabytes (MB) or more. In comparison, some embodiments herein may automatically retier data in real time or near real time, on relatively small sets of data, such as blocks of 512 bytes.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 is a block diagram of an example operating environment 100 that includes a storage system 102, a network 104, and one or more client devices 106, arranged in accordance with at least one embodiment described herein. The client devices 106 are clients of the storage system 102 and may generally include one or more workstations, servers, hypervisors, or other devices or systems that write data to or read data from the storage system 102.

The storage system 102 may include tiered storage 108, a fabric manager 110, and a compute node 112 and may be implemented as a cloud storage system or an on premises storage system. In general, the storage system 102 may combine different block-storage offerings (e.g., of a cloud provider or on premises storage) to create a blended storage pool and may transparently manage the allocation of space from each different block-storage offering. Alternatively or additionally, the storage system 102 may simplify a user experience and optimize for cost. In some implementations of the storage system 102, a customer or other user may no longer have to use the most expensive storage to ensure their important data has sufficient performance, or manually manage which data goes on fast versus slow storage, as the storage system 102 may automatically manage this for the customer.

In these and other embodiments, the tiered storage 102 includes multiple block-storage offerings, or multiple storage tiers 114A, 114B, . . . 114N (hereinafter collectively "storage tiers 114"). While illustrated as including N storage tiers 114, more generally the tiered storage 102 may include two or more storage tiers 114. Each of the storage tiers 114 has a different performance level (e.g., different IOPS). For example, the storage tier 114A may have a first performance level, the storage tier 114B may have a second performance level lower or worse than the first performance level, and the storage tier 114N may have an Nth performance level lower or worse than the second performance level.

In some embodiments, each storage tier 114 in the tiered storage 102 may include one or more storage devices whose performance levels determine the performance level of the corresponding storage tier 114. As an example, the storage tier 114A may include one or more non-volatile dual in-line memory modules (NVDIMMs) having approximately $10^6+$ read/write IOPS such that the performance level of the storage tier 114A may be approximately $10^6+$ read/write IOPS. As another example, the storage tier 114B may include one or more solid-state drives (SSDs) having approximately $10^3+$ read/write IOPS such that the performance level of the storage tier 114B may be approximately $10^3+$ read/write IOPS. As another example, the storage tier 114A may include one or more hard disk drives (HDDs) having approximately $10^2$ read/write IOPS such that the performance level of the storage tier 114N may be approximately $10^2$ read/write IOPS.

The fabric manager 110 may generally be configured to manage and secure the flow of data between the storage clients 108 and the tiered storage 102. The fabric manager 110 may provide a control interface for the storage system 102 through which users may, e.g., provision storage (as part of the tiered storage 108), set policies for data stores, manually initiate a retiering algorithm, or other control processes.

The compute node 112 may generally include a processor and memory or other computer storage medium with instructions stored thereon that are executable by the processor to perform or control performance of various storage or retiering operations or processes of the storage system 102. For example, the compute node 112 may present one or more storage services to the client devices 106, such as file sharing, block storage, or object storage and service read and write requests from the client devices 106.

Although a single compute node 112 is depicted in FIG. 1, the storage system 102 may more generally include one or more compute nodes 112. For example, the storage system 102 may include a pair of compute nodes 112 implemented as a high-availability (HA) pair, e.g., of which controls a corresponding set of tiered storage 108, to provide the client devices 106 with nearly-uninterruptable access to their data in the event one of the pair of compute nodes 112 either fails unexpectedly or is rebooted.

In general, the network 104 may include one or more wide area networks (WANs) and/or local area networks (LANs) that enable the client devices 106 and the storage system 102 to communicate with each other. In some embodiments, the network 104 may include or be implemented as part of a storage area network (SAN), a serial AT attachment (SATA) bus, or the Internet, including a global internetwork formed by logical and physical connections between multiple WANs and/or LANs. Alternately or additionally, the network 104 may include one or more cellular radio frequency (RF) networks, a public switched telephone network (PSTN), and/or one or more wired and/or wireless networks such as 802.xx networks, Bluetooth access points, wireless access points, Internet Protocol (IP)-based networks, or other wired and/or wireless networks. The network 104 may also include servers that enable one type of network to interface with another type of network.

Figure 2:
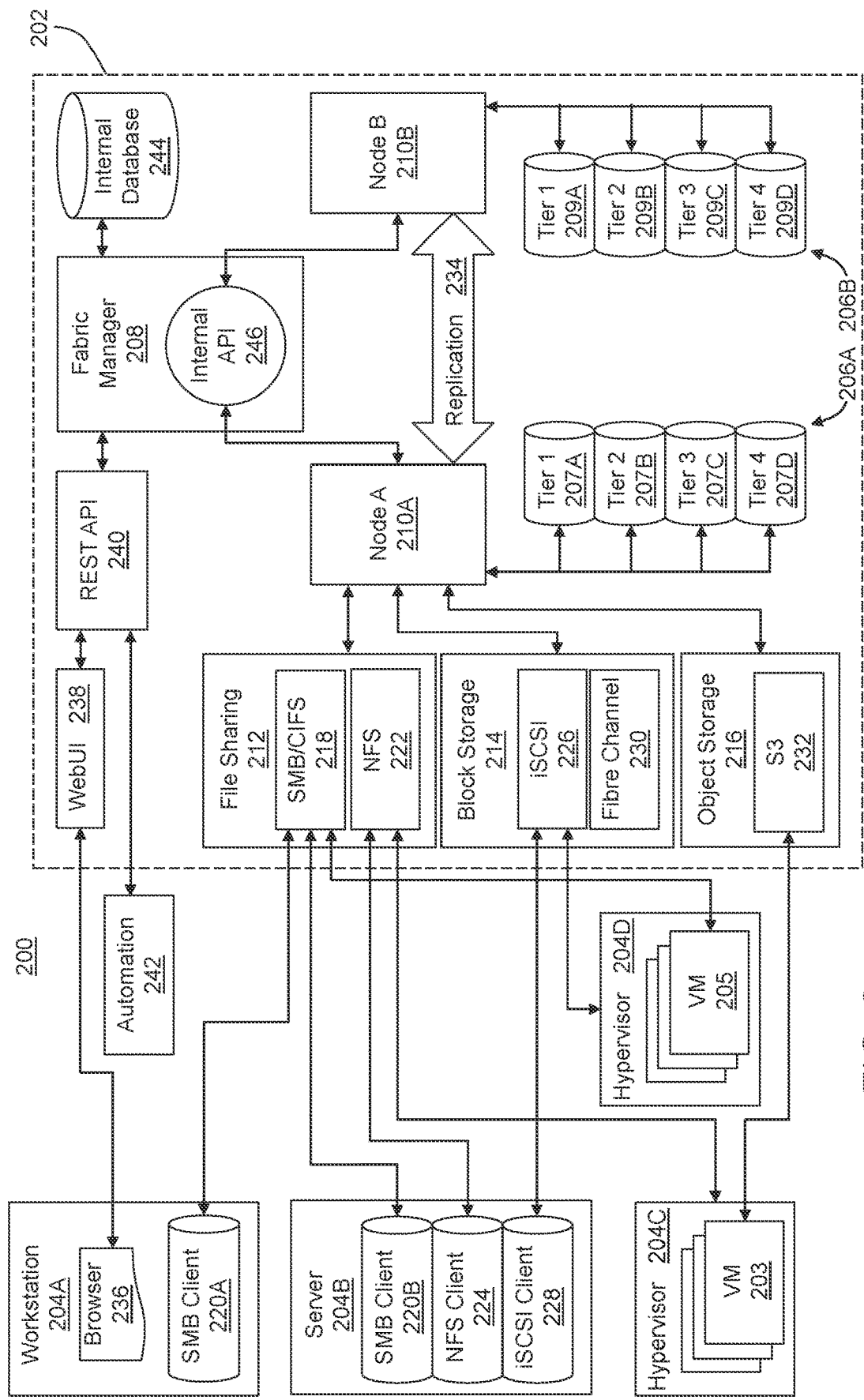
FIG. 2 is a block diagram of another example operating environment that includes a storage system and client devices.

FIG. 2 is a block diagram of another example operating environment 200 that includes a storage system 202 and client devices 204A, 204B, 204C, 204D (hereinafter collectively "clients device 204" or generically "client device 204"), arranged in accordance with at least one embodiment described herein. The storage system 202 and the client devices 204 may respectively include, be included in, or correspond to the storage system 102 and the client devices 106 of FIG. 1. As such, the client devices 204 are clients of the storage system 202 and specifically include a workstation 204A, a server 204B, and hypervisors 204C, 204D that write data to or read data from the storage system 202. Each of the hypervisors 204C, 204D may run one or more virtual machines (VMs) 203, 205. The operating environment 200 may additionally include a network such as the network 104 of FIG. 1 but such a network has been omitted from FIG. 2 for simplicity.

The storage system 202 includes tiered storage 206A, 206B (hereinafter collectively or generically "tiered storage 206"), a fabric manager 208, and compute nodes 210A, 210B (hereinafter collectively "compute nodes 210" or generically "compute node 210") that may respectively include, be included in, or correspond to the tiered storage 108, the fabric manager 110, and the compute node 112 of FIG. 1. The tiered storage 206A includes storage tiers 207A-207D (hereinafter collectively "storage tiers 207") and the tiered storage 206B includes storage tiers 209A-209D (hereinafter collectively "storage tiers 209").

The compute node 210A presents various services to the client devices 204, including a file sharing service 212, a block storage service 214, and an object storage service 216.

The file sharing service 212 may serve a Server Message Block (SMB)/Common Internet File System (CIFS)-compatible application programming interface (API) 218 to SMB clients 220A, 220B (hereinafter collectively "SMB clients 220") on any of the client devices 204, specifically on the workstation 204A, the server 204B, and one or more of the VMs 205 in the example of FIG. 2. Alternatively or additionally, the file sharing service 212 may serve a Network File System (NFS)-compatible API 222 to NFS clients 224 on any of the client devices 204, specifically on the server 204B and the hypervisor 204C in the example of FIG. 2. The file sharing service 212 may be used to service read and write requests for data in file storage format, although the data itself may be stored in block storage format by the compute node 210A on the tiered storage 206A. Thus, the file sharing service 212 or the compute node 210A may convert data between file and block storage formats to service read or write requests from SMB or NFS clients.

The block storage service 214 may serve an Internet Small Computer Systems Interface (iSCSI)-compatible API 226 to iSCSI clients 228 on any of the client devices 204, specifically on the server 204B and the hypervisor 204D in the example of FIG. 2. Alternatively or additionally, the block storage service 214 may serve a Fibre Channel (FC)-compatible API 230 to FC clients on any of the client devices 204.

The object storage service 216 may serve any type of object storage API, such as an Amazon Simple Storage Service (S3)-compatible API 232 to S3 clients on any of the client devices 204, specifically on one or more of the VMs 203 in the example of FIG. 2. The object storage service 216 may be used to service read and write requests for data in object storage format, although the data itself may be stored in block storage format by the compute node 210A on the tiered storage 206A. Thus, the object storage service 216 or the compute node 210A may convert data between object and block storage formats to service read or write requests from S3 or other object storage clients.

Although not illustrated in FIG. 2, the compute node 210B may presents the same or similar services as the compute node 210A to the client devices 204. The storage system 202 may further include a replication process 234 to replicate data between the compute nodes 210. In other embodiments, the storage system 202 may include a single compute node 210 and a single tiered storage 206, e.g., in applications where failover redundancy is not needed.

The workstation 204A may additionally include a browser 236 or other application to communicate with the fabric manager 208 to enter or change commands or control of the storage system 202. In this example, the browser 236 accesses the fabric manager 208 through a web UI 238 and a representational state transfer (REST) API 240. The REST API 240 may translate input provided through the UI 238 to commands for the fabric manager 208.

Alternatively or additionally, one or more automation features 242 may be implemented through the REST API 240, such as automating the provisioning and standing up of new sets of storage nodes (e.g., in AWS, MS Azure Cloud, or other cloud provider).

The storage system 202 may additionally include an internal database 244. The internal database 244 may include a list of nodes of the storage system 202, their locations, and how to find them. Alternatively or additionally, the internal database 244 may persist AWS keys or other keys so the fabric manager 208 may purchase additional tiered storage or one or more specific storage tier(s) within the tiered storage 206, if needed, or release excess storage if no longer needed.

As further illustrated in FIG. 2, the fabric manager 208 may include an internal API through which the fabric manager 208 and the compute nodes 210 communicate.

Similar to the storage system 102 of FIG. 1, the storage system 202 of FIG. 2 may combine different block-storage offerings (e.g., of a cloud provider or on premises storage) to create a blended storage pool and may transparently manage the allocation of space from each different block-storage offering. Alternatively or additionally, the storage system 202 may simplify a user experience and optimize for cost. In some implementations of the storage system 202, a customer or other user may no longer have to use the most expensive storage to ensure their important data has sufficient performance, or manually manage which data goes on fast versus slow storage, as the storage system 202 may automatically manage this for the customer.

Each filesystem or other data store that is stored on the storage system 202 may have a configurable policy that defines at least one of a default storage tier or one or more overflow storage tiers. As a default, a data store or more specifically blocks that make up the data store may be stored on the storage tier specified as the default storage tier in the policy of the data store.

One or more blocks of the data store may optionally be stored on or retiered to any of the one or more overflow storage tiers defined in the policy. For example, if the default storage tier of a data store is full when some or all of the data store is being written to the tiered storage 206, blocks of the data store that do not fit on the default storage tier may overflow to the overflow storage tier. Alternatively or additionally, if activity, age, or other statistics for blocks of the data store indicate performance of the storage system 202 may be improved by having the blocks on the overflow storage tier(s) instead of the default storage tier, the blocks may be retiered to the overflow storage tier(s).

An example policy for a data store is storage tier X or faster, which may be used to ensure that specific data does not move to a tier that is below a particular performance threshold (e.g., a "too slow" tier). This policy defines storage tier X as the default storage tier for the data store and any storage tier with a higher (e.g., faster) performance level than storage tier X as an overflow storage tier. A more particular example in the context of FIG. 2 is the storage tier 207D or faster. This policy defines the storage tier 207D as the default storage tier for the data store and storage tiers 207A-207C as overflow storage tiers for the data store.

Another example policy for a data store is storage tier X or slower, which may be used to ensure that unimportant data does not move to an expensive tier, even if the unimportant data is used relatively frequent, or with a particular frequency. This policy defines storage tier X as the default storage tier for the data and any storage tier with a lower (e.g., slower) performance level than storage tier X as an overflow storage tier. A more particular example in the context of FIG. 2 is the storage tier 207C or slower. This policy defines the storage tier 207C as the default storage tier for the data store and the storage tier 207D as the overflow storage tier for the data store.

Another example policy for a data store is always use tier X. This policy defines storage tier X as the default storage tier for the data store and limits the data store the storage tier X. That is, this policy does not define any overflow storage tiers. A more particular example in the context of FIG. 2 is always use the storage tier 207A. This policy defines the storage tier 207A as the default storage tier for the data store without defining any overflow storage tiers for the data store. Additionally or alternatively, the policy may define one or more overflow storage tiers in the event that the default storage tier is full.

Data stores may be stored in the tiered storage 206 using block pointers, which may allow a given data store to be spread across multiple storage devices and/or storage tiers. In these and other embodiments, the storage system 202 may implement the ZFS file system. Alternatively or additionally, whenever data is stored to the tiered storage 206, metadata may be generated and associated with the data. The metadata may include, among other things, block pointers. Block pointers may point to one or more storage locations in the tiered storage 206 where data blocks are stored. Each file stored in the tiered storage 206 may include multiple data blocks. The tiered storage 206 may be formatted in a variable-block layout or a fixed-block layout. In the variable-block layout, data is stored in blocks of variable size. In the fixed-block layout, data is stored in blocks of fixed size.

When the compute node 210 receives a read request, e.g., for a file, the compute node 210 may look up an object number from a directory based on a filename of the file. The object number may be used to determine a location of an indirect block pointer of the file. The indirect block pointer may point to an array of block pointers for the file, where each block pointer in the array points to a different block of data of the file such that the blocks of data may be retrieved to reconstruct the file. Each of the block pointers may include metadata such as a birth time that indicates when the block pointed to by the block pointer was written to the tiered storage and its settings. The settings of a given block may include if and how the block is encrypted, if and how the block is compressed, a size of the block originally and after compression, and a checksum of the block. Alternatively or additionally, each block pointer may include a second birth time that indicates when the block pointed to by the block pointer was retiered last, e.g., the last time the block was relocated from one of the storage tiers 207 to another of the storage tiers 207.

In some implementations, different storage tiers 207, 209 may be attached with optional Redundant Array of Independent Disks (RAID) transformations.

When the storage system 202 backs storage without uptime or data integrity guarantees, the storage system 202 may combine multiple storage devices within the tiered storage 206 to increase reliability.

In some embodiments, the storage system 202 may transparently retier data between different storage tiers 207, 209 to match the corresponding policy of the data and/or to optimize price or performance. In this or other embodiments, the storage system 202 may maximize usage and impact of the most expensive storage tier (e.g., storage tier 207A, 209A) with the best performance level, while not wasting it on infrequently accessed data. Unused space on the storage tier with the best performance level is wasted, so the storage system 202 may keep as much data on it as possible to extract maximum value.

Transparent retiering as used herein may refer to moving data without interrupting live usage. In comparison, other storage systems may interrupt live usage to retier data. Thus, data in the storage system 202 may be moved from one storage tier 207, 209 to another without interrupting live reading/writing of the data. Alternatively or additionally, data may be retiered based on policy, e.g., by moving data to a default storage tier or overflow storage tier specified in a policy of the data. Alternatively or additionally, data may be retiered based on age, e.g., by moving older data to slow tiers or storage tiers 207, 209 with lower performance level then where the data is currently located. Alternatively or additionally, data may be retiered based on activity, e.g., by moving busy data to faster tiers or storage tiers 207 with higher performance level then where the data is currently located. Retiering may be triggered manually or by low free space on a specific storage tier 207, 209 to move data on the specific storage tier 207, 209 to other storage tier(s) to make room on the specific storage tier 207, 209. Retiering may also be triggered by high levels of activity on a specific block.

Figure 3:
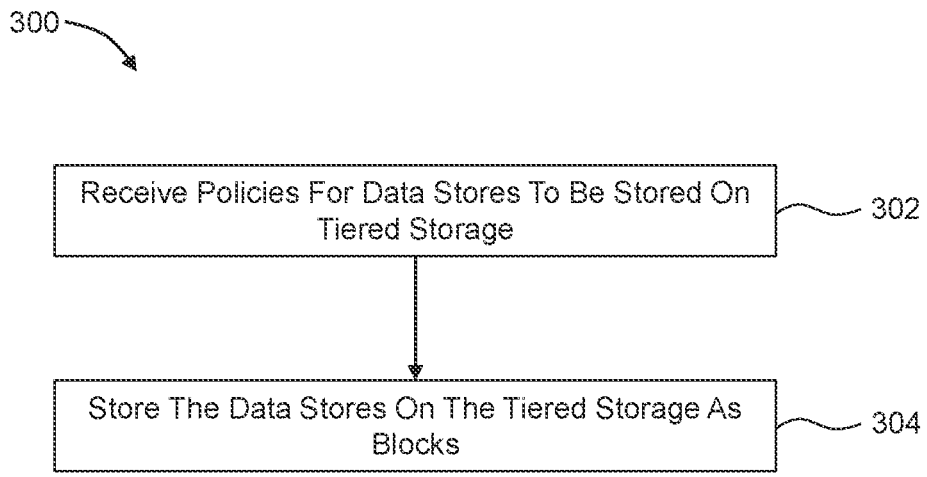
FIG. 3 is a flowchart of a method to store data in a tiered storage.

FIG. 3 is a flowchart of a method 300 to store data in a tiered storage, arranged in accordance with at least one embodiment described herein. The method 300 may be programmably performed or controlled by a processor. In an example implementation, the method 300 may be performed in whole or in part by the compute node 112, 210 and/or the fabric manager 110, 208 of FIG. 1 or 2. For instance, the compute node 210 may perform the method 300 or variations thereof. The compute node 210 may include a memory or other computer-readable storage medium with computer instructions stored thereon that are executable by a processor of the compute node 210 to perform or control performance of the method 300 or variations thereof. The method 300 may include one or more of operations 302 and/or 304. The method 300 and variations thereof may be discussed in the context of FIGS. 1 and 2.

At operation 302, the method 300 includes receiving policies for data stores to be stored on a tiered storage, such as the tiered storage 108 or 206 of FIG. 1 or 2. The tiered storage includes multiple storage tiers, such as storage tiers 114, 207, 209 of FIG. 1 or 2. Each storage tier may have a different performance level. Each policy may define a default storage tier of the storage tiers for the corresponding data store that has the policy. Operation 302 may be followed by operation 304.

At operation 304, the method 300 includes storing the data stores on the tiered storage as blocks of data, each of the blocks stored to a corresponding one of the storage tiers of the tiered storage based at least on the policy of the data store to which the block belongs. Each of the blocks may be relatively small, such as a few kilobytes (kB) or less. In an example implementation, each of the blocks is 512 bytes.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

For example, storing the data stores on the tiered storage as the blocks at operation 304 may include storing block pointers on the tiered storage. Each of the block pointers may point to a location in the tiered storage of a different one of the blocks. In this or other embodiments, the method 300 may further include identifying a first block to be moved from a first location on a first storage tier, such as the storage tier 207B, of the storage tiers to a second location on a second storage tier, such as the storage tier 207A, 207C, or 207D, of the storage tiers. A first block pointer of the first block that points to the first location may be replaced with a second block pointer that points to the second location. The first block may be moved from the first location on the first storage tier to the second location on the second storage tier.

In some implementations of the method 300, a given data store may be stored across various storage tiers of the tiered storage. For example, the data stores may include a first data store and storing the data stores on the tiered storage as the blocks at operation 304 may include storing a first block of the first data store on a first storage tier, such as the storage tier 207A, and storing a second block of the first data store on a second storage tier, such as the storage tier 207B, that is different than the first storage tier.

Alternatively or additionally, each policy of each data store may further define one or more overflow storage tiers. A first policy of a first data store may define a first storage tier as the default storage tier for the first data store. A second policy of a second data store may define a second storage tier as the default storage tier for the second data store and the first storage tier as the overflow storage tier for the second data store. The first storage tier may have a better performance level than the second storage tier. Storing the data stores on the tiered storage as the blocks based at least on the policy of each data store at operation 304 may include: storing blocks of the first data store on the first storage tier according to the first policy; and storing blocks of the second data store on the second storage tier according to the second policy. The method 300 may further include: determining that the first storage tier has unused capacity; and relocating at least some blocks of the second data store from the second storage tier to the first storage tier. For example, suppose the first and second storage tiers are, respectively, the storage tiers 207A and 207B of FIG. 2 where the storage tier 207A has a better performance level than the storage tier 207B. At least initially, blocks of the first data store may be stored on the storage tier 207A according to the first policy and blocks of the second data store may be stored on the storage tier 207B according to the second policy. The storage system 202 may then determine that the storage tier 207A has unused capacity and, based at least on the storage tier 207A being defined as the overflow storage tier for the second data store by the second policy, the storage system 202 may relocate, or retier, at least some blocks of the second data storage from the storage tier 207B to the storage tier 207A. For example, the busiest blocks of the second data store may be relocated to the storage tier 207A.

In some embodiments, the method 300 may further include generating statistics of at least some of the blocks. The statistics of each block may include at least one of a last access time or activity level of the block. The method 300 may further include moving one or more blocks between storage tiers based on at least one of the statistics of each of the one or more blocks and a corresponding policy of a corresponding data store to which each of the one or more blocks belongs. In this and other embodiments, some of the blocks, including those blocks accessed recently, may be cached in a memory cache of the compute node 210 and the statistics may be generated by the compute node 210 and stored in the memory cache. The statistics may be generated and/or updated each time a cached block is accessed or when a block is added to the cache. The compute node 210 may signal the retiering algorithm each time a block's statistics are generated and/or updated. If warranted by the statistics of the block and permitted by the policy of the data store to which the block belongs, the retiering algorithm executed on the compute node 210 may move the block to a storage tier with better performance level (e.g., a faster storage tier).

In some embodiments, the statistics may be generated in real time or near real time and blocks that are moved may be moved in real time or near real time. Performing an operation such as generating statistics or moving blocks in real time may include moving the blocks synchronously (e.g., as part of the operation and before doing other work). The blocks may be moved asynchronously, which may include queuing the operation and allowing the operation to be performed later, such as performing the operation within 5 seconds. The blocks may also be flagged for later processing, such as in a next batch operation, which could include any time in the future, such as 30 minutes later, 1 hour later, a day later, etc.

Generating the statistics may include incrementing a hit counter of each of the one or more blocks in a memory cache each time the corresponding block is read or written. Moving one or more blocks between storage tiers based on at least one of the statistics of each of the one or more blocks or the corresponding policy may include moving the corresponding block in response to the hit counter of the corresponding block exceeding a threshold value. In some embodiments, the storage system 202 may have or consider multiple threshold values. For example, if permitted by a corresponding policy, the hit counter exceeding a first threshold value that is relatively low may warrant moving a block from the storage tier 207D to the storage tier 207C, the hit counter exceeding a second threshold value that is greater than the first threshold value may warrant moving a block from the storage tier 207C to the storage tier 207B, and the hit counter exceeding a third threshold value that is greater than the second threshold value may warrant moving a block from the storage tier 207B to the storage tier 207A.

Figure 4:
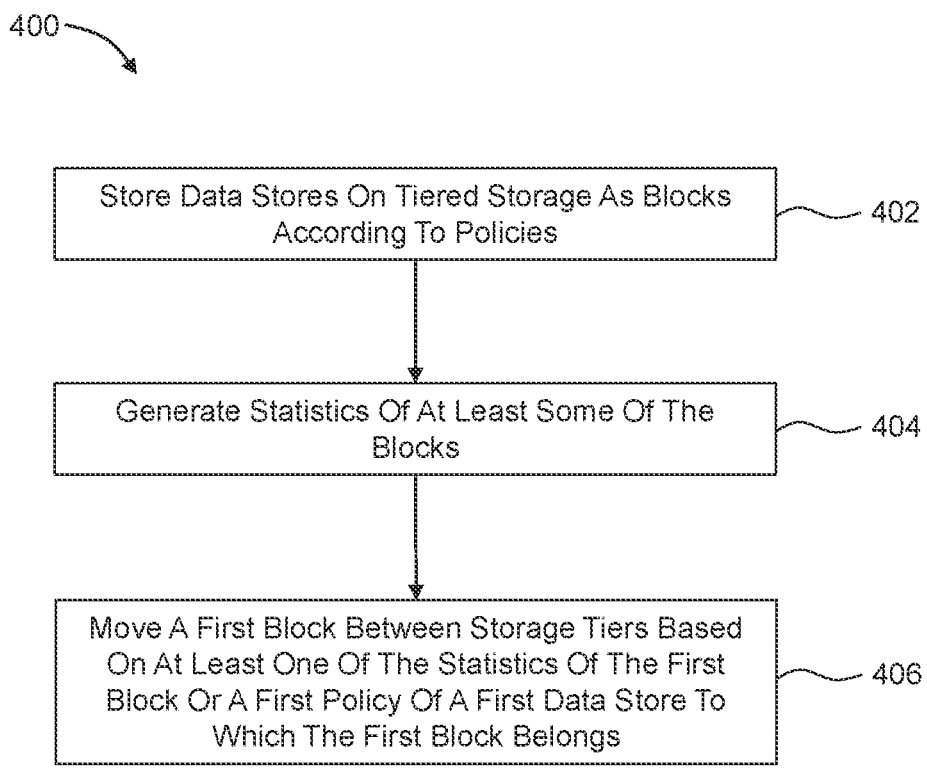
FIG. 4 is a flowchart of a method to retier data in tiered storage.

FIG. 4 is a flowchart of a method 400 to retier data in tiered storage, arranged in accordance with at least one embodiment described herein. The method 400 may be programmably performed or controlled by a processor. In an example implementation, the method 400 may be performed in whole or in part by the compute node 112, 210 and/or the fabric manager 110, 208 of FIG. 1 or 2. For instance, the compute node 210 may perform the method 400 or variations thereof. The compute node 210 may include a memory or other computer-readable storage medium with computer instructions stored thereon that are executable by a processor of the compute node 210 to perform or control performance of the method 400 or variations thereof. The method 400 may include one or more of operations 402, 404, and/or 406. The method 400 and variations thereof may be discussed in the context of FIGS. 1 and 2.

At operation 402, the method 400 includes storing data stores on tiered storage, such as the tiered storage 108 or 206 of FIG. 1 or 2, as blocks according to policies. The tiered storage includes multiple storage tiers, such as storage tiers 114, 207, 209 of FIG. 1 or 2. Each storage tier may have a different performance level. Each policy may define a default storage tier of the storage tiers for the corresponding data store that has the policy. Operation 402 may be followed by operation 404.

At operation 404, the method 400 includes generating statistics of at least some of the blocks, the statistics of each block including at least one of a last access time or activity level of the block. In some embodiments, the statistics may be generated as the first block is read or written and the first block may be moved as the first block is read or written. Operation 404 may be followed by operation 406.

At operation 406, the method 400 includes moving a first block between storage tiers based on at least one of the statistics of the first block or a first policy of a first data store to which the first block belongs.

Generating the statistics at operation 404 may include incrementing a hit counter of the first block in a memory cache each time the first block is read or written. Moving the first block between storage tiers based on at least one of the statistics of the first block or the first policy of the first data store to which the first block belongs may include moving the first block in response to the hit counter exceeding a threshold value. In some embodiments, the storage system 202 may have or consider multiple threshold values. For example, if permitted by the first policy, the hit counter exceeding a first threshold value that is relatively low may warrant moving the first block from the storage tier 207D to the storage tier 207C, the hit counter exceeding a second threshold value that is greater than the first threshold value may warrant moving the first block from the storage tier 207C to the storage tier 207B, and the hit counter exceeding a third threshold value that is greater than the second threshold value may warrant moving a block from the storage tier 207B to the storage tier 207A.

Storing the data stores on the tiered storage as the blocks at operation 402 may include storing block pointers on the tiered storage. Each of the block pointers may point to a location in the tiered storage of a different one of the blocks.

For example, storing the data stores on the tiered storage as the blocks at operation 304 may include storing block pointers on the tiered storage. Each of the block pointers may point to a location in the tiered storage of a different one of the blocks. In this or other embodiments, the method 400 may further include determining a first location of the first block on a first storage tier, such as the storage tier 207B, at which the first block is located and a second location on a second storage tier, such as the storage tier 207A, 207C, or 207D, to which to move the first block. A first block pointer of the first block that points to the first location may be replaced with a second block pointer that points to the second location. The first block may be moved from the first location to the second location after replacing the first block pointer with the second block pointer. In at least one embodiment, the operations may include writing the block to its new location, writing the new block pointer that points to that new location, removing the old block pointer, and freeing the space where the old copy of block was stored.

Moving the first block between storage tiers based on at least one of the statistics of the first block or the first policy at operation 406 may include moving the first block from a first storage tier to a second storage tier with a better performance level in response to the statistics indicating the first block is busy and the first policy permitting movement to the second storage tier. For example, suppose the first and second storage tiers are, respectively, the storage tier 207B and the storage tier 207A where the storage tier 207A has a better performance level than the storage tier 207B. If warranted by the statistics of the first block and permitted by the first policy of the first data store to which the first block belongs, the compute node 210 may move the first block to from the storage tier 207B to the storage tier 207A.

The method 400 may further include moving a second block from a first storage tier to a second storage tier with a worse performance level in response to statistics of the second block indicating the second block was last accessed more than a threshold time ago and the corresponding policy permitting movement to the second storage tier. For example, suppose the first and second storage tiers are, respectively, the storage tier 207A and the storage tier 207B where the storage tier 207B has a worse performance level than the storage tier 207A. If the second block is not in the memory cache of the compute node 210 such that its statistics are the absence of statistics in the memory cache, or if the second block is in the memory cache but has not been accessed in more than a threshold amount of time, and a policy of a data store to which the second block belongs permits movement of the second block from the storage tier 207A to the storage tier 207B, the method 400 may include moving the second block from the storage tier 207A to the storage tier 207B. The second block may be moved from the storage tier 207A to the storage tier 207B as part of the retiering algorithm, e.g., to create more space on the storage tier 207A if the storage tier 207A is low on space.

Alternatively or additionally, the method 400 may further include, after moving the first block from a first location on a first storage tier to a second location on a second storage tier, queuing the first location to become free space. By queueing the first location to become free space, the first location may subsequently be used to store another block on the first storage tier.

In some implementations, moving the first block between storage tiers at operation 406 may include moving the first block from a first storage tier to a second storage tier with a better performance level. The method 400 may further include, prior to moving the first block from the first storage tier to the second storage tier: determining that the second storage tier has free space; determining that the first policy of the first data store to which the first block belongs allows promotion of blocks of the first data store to the second storage tier; and determining that a hit counter that indicates the activity level of the first block exceeds a threshold value.

Figure 5:
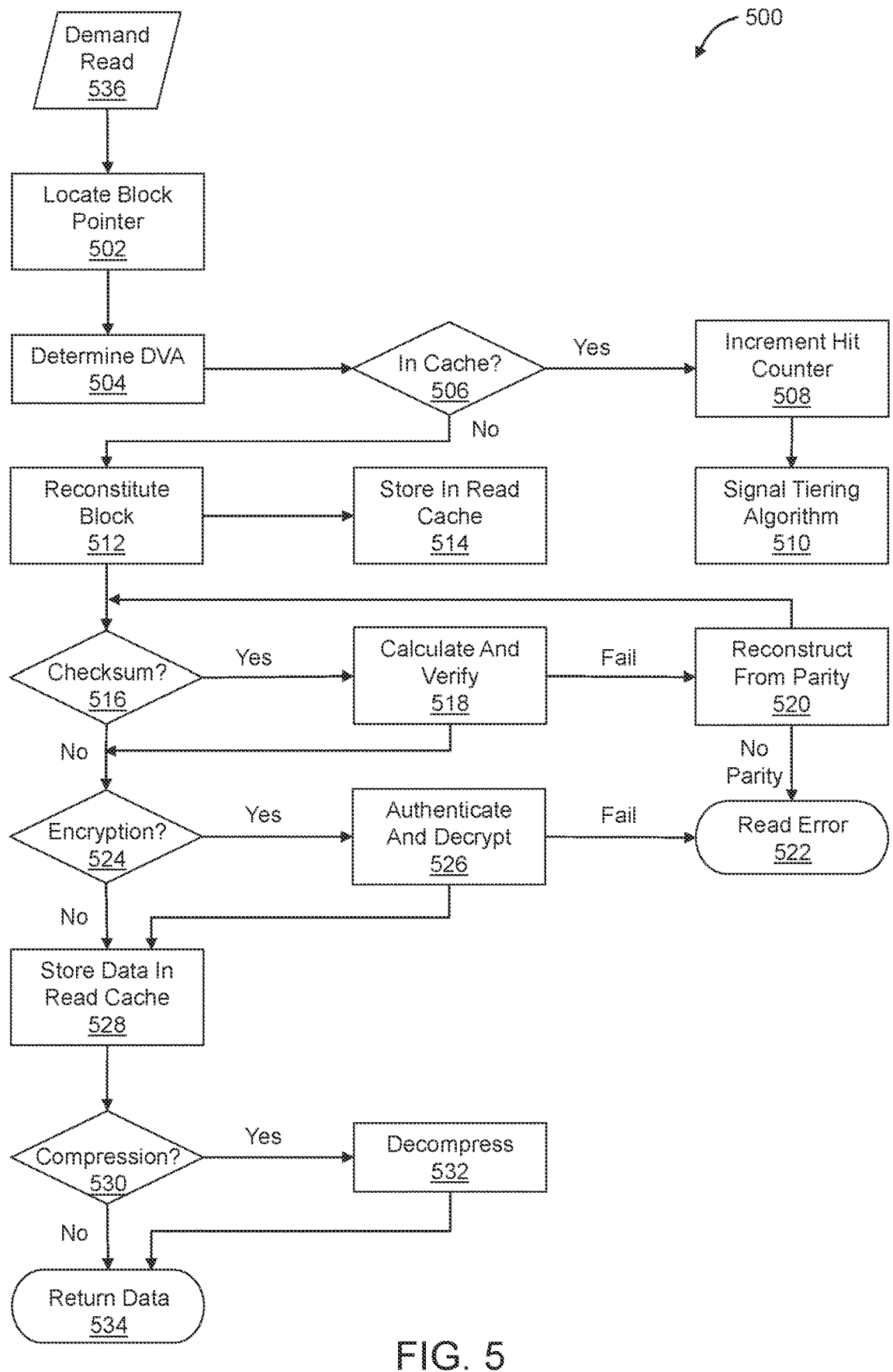
FIG. 5 is a flowchart of a method to read data from tiered storage.

FIG. 5 is a flowchart of a method 500 to read data from tiered storage, arranged in accordance with at least one embodiment described herein. The method 500 may be programmably performed or controlled by a processor. In an example implementation, the method 500 may be performed in whole or in part by the compute node 112, 210 and/or the fabric manager 110, 208 of FIG. 1 or 2. For instance, the compute node 210 may perform the method 500 or variations thereof. The compute node 210 may include a memory or other computer-readable storage medium with computer instructions stored thereon that are executable by a processor of the compute node 210 to perform or control performance of the method 500 or variations thereof. The method 500 may include one or more of operations 502, 504, 506, 508, 510, 512, 514, 516, 518, 520, 522, 524, 526, 528, 530, 532, and/or 534. The method 500 and variations thereof may be discussed in the context of FIGS. 1 and 2.

At operation 502, the compute node 210 may receive a read request 536 and locate a block pointer from the read request 536. In some embodiments, locating the block pointer may include locating a dataset, object, and/or offset.

At operation 504, the compute node 210 determines a Data Virtual Address (DVA) from the block pointer. A DVA may be similar to a logical block address (LBA) but includes the storage device identifier and the block address is subject to transformations such as RAID where multiple physical disks are combined to create a larger range of block addresses.

At operation 506, the compute node 210 determines if the DVA is in the memory cache of the compute node 210. If the DVA is in the memory cache ("Yes" at operation 506), the compute node 210 increments a hit counter of the block at operation 508 and may signal the tiering algorithm at operation 510, an example of which is further described in conjunction with FIG. 7A. If the DVA is not in the memory cache ("No" at operation 506), the compute node 210 reconstitutes the block at operation 512 and may cache the block pointer in the memory cache of the compute node 210 at operation 514, the block indexed by DVA in the memory cache.

At operation 516, the compute node 210 determines if a checksum is enabled for the block. If the checksum is enabled ("Yes" at operation 516), the compute node 210 calculates and verifies the checksum at operation 518. If the checksum calculation and verification fails, the compute node 210 reconstructs the block from parity information at operation 520 or if there is no parity information returns a read error at operation 522.

If the checksum is not enabled ("No" at operation 516) or after calculating and verifying the checksum at operation 518, the compute node 210 determines if encryption is enabled for the block. If encryption is enabled ("Yes" at operation 524), the compute node 210 authenticates and decrypts the encrypted block at operation 526. If authentication and decryption fails, the compute node 210 returns a read error at operation 522.

If encryption is not enabled ("No" at operation 524) or after authenticating and decrypting the encrypted block at operation 526, the compute node 210 may store the data of the block in the memory cache at operation 528.

At operation 530, the compute node 210 determines if compression is enabled. If compression is enabled ("Yes" at operation 530), the compute node 210 decompresses the block at operation 532. If compression is not enabled ("No" at operation 530), or after decompressing the block at operation 532, the compute node returns the data of the block, e.g., to the client device 204 that sent the read request 536.

Figure 6A:
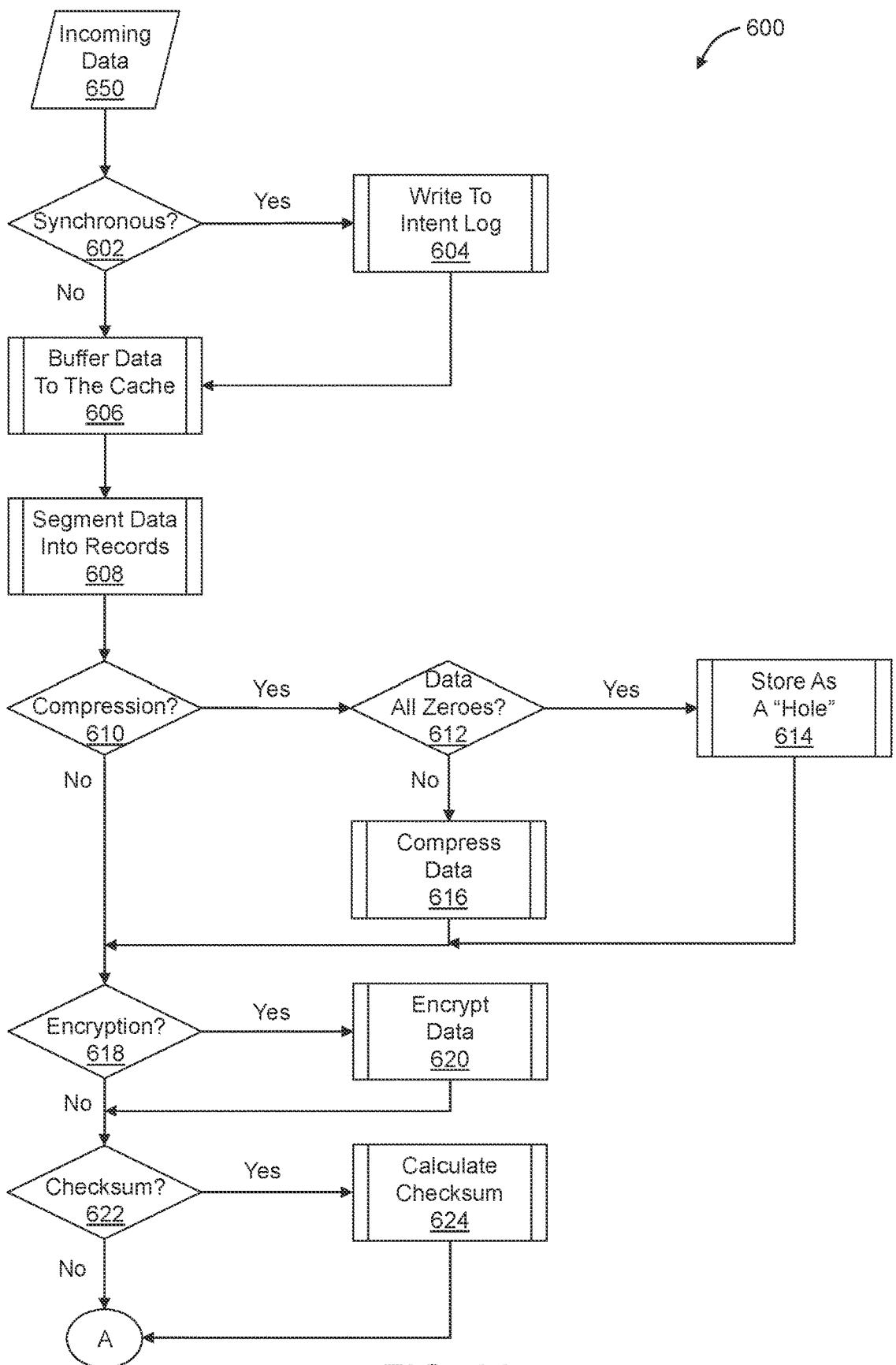
FIGS. 6A and 6B are a flowchart of a method to write data such as a file to tiered storage.
Figure 6B:
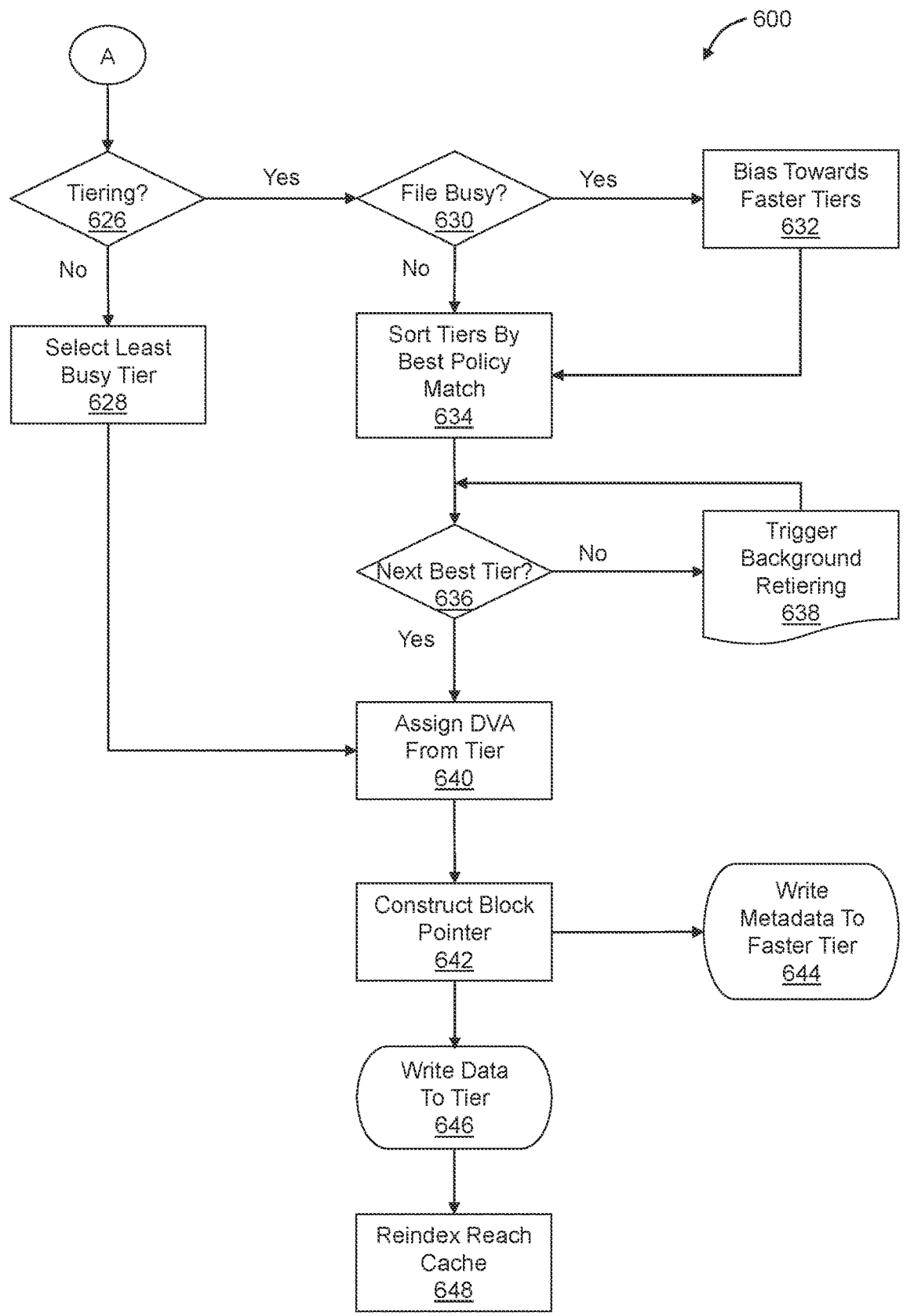

FIGS. 6A and 6B are a flowchart of a method 600 to write data such as a file to tiered storage, arranged in accordance with at least one embodiment described herein. The method 600 may be programmably performed or controlled by a processor. In an example implementation, the method 600 may be performed in whole or in part by the compute node 112, 210 and/or the fabric manager 110, 208 of FIG. 1 or 2.

For instance, the compute node 210 may perform the method 600 or variations thereof. The compute node 210 may include a memory or other computer-readable storage medium with computer instructions stored thereon that are executable by a processor of the compute node 210 to perform or control performance of the method 600 or variations thereof. The method 600 may include one or more of operations 602, 604, 606, 608, 610, 612, 614, 616, 618, 620, 622, 624, 626, 628, 630, 632, 634, 636, 638, 640, 642, 644, 646, and/or 648. The method 600 and variations thereof may be discussed in the context of FIGS. 1 and 2.

Referring first to FIG. 6A, at operation 602, the compute node 210 may determine whether incoming data 650 is part of a synchronous or asynchronous write request. If the write request is synchronous ("Yes" at operation 602), the incoming data 650 is written to an intent log at operation 604. If the compute node 210 reboots unexpectedly, the intent log is replayed to recover the synchronous writes.

If the write request is asynchronous ("No" at operation 602) or after writing the synchronous writes to the intent log at operation 604, the compute node 606 may buffer the data to its memory cache at operation 606. At operation 608, the compute node 606 may segment the data into records.

At operation 610, the compute node 210 may determine whether compression is enabled. If compression is enabled ("Yes" at operation 610), the compute node 210 may determine whether the data is all zeroes at operation 612. If the data is all zeroes ("Yes" at operation 612), the data may be stored as a hole at operation 614. If the data is not all zeroes ("No" at operation 612), the data may be compressed at operation 616.

If compression is not enabled ("No" at operation 610), or after storing all zero data as a hole at operation 614, or after compressing data that is not all zeroes at operation 616, the compute node 210 may determine whether encryption is enabled at operation 618. If encryption is enabled ("Yes" at operation 618), the compute node 210 may encrypt the data.

If encryption is not enabled ("No" at operation 618), or after encrypting the data at operation 620, the compute node 210 may determine whether checksum is enabled at operation 622. If checksum is enabled ("Yes" at operation 622), the compute node 210 may calculate a checksum of the data at operation 624.

If checksum is not enabled ("No" at operation 622), or after calculating the checksum at operation 624, the compute node 210 may determine whether tiering is enabled at operation 626, as illustrated in FIG. 6B. If tiering is not enabled ("No" at operation 626), the compute node 210 may select a least busy storage tier to store the data.

If tiering is enabled ("Yes" at operation 626), the compute node 210 may determine whether the file that includes the data is busy. If the file is busy ("Yes" at operation 630), the data may be biased towards faster storage tiers, e.g., storage tiers with better performance level, at operation 632. If the file is not busy ("No" at operation 630) or after biasing the data towards faster storage tiers, the compute node 210 may sort the storage tiers by best policy match. That is, the compute node 210 may sort the storage tiers according to how well they match a policy of the data or the file that includes the data.

At operation 636, the compute node 210 may determine whether a next best storage tier in the sorted list of storage tiers is available, that is, whether the next best storage tier has space available to store the data. If the next best storage tier is not available ("No" at operation 636), the compute node 210 may trigger a background retiering algorithm at operation 638 and loop back to operation 636 to consider a next storage tier in the sorted list of storage tiers. Operations 636 and 638 may repeat until it is determined that a storage tier is available ("Yes" at operation 636) and is selected to store the data or other criteria is met. The background retiering algorithm is described in more detail with respect to FIGS. 7B and 7C.

If the next best storage tier is available ("Yes" at operation 636) or after selecting the least busy storage tier at operation 628, the compute node 210 may assign a DVA from the selected storage tier to the data at operation 640.

At operation 642, the compute node 210 may construct a block pointer for the data, or multiple block pointers including one block pointer per block if the data is larger than a single block.

At operation 644, the compute node 210 may write metadata of the data, including the block pointer(s), to a faster storage tier, such as the storage tier 207A, 209A of FIG. 2. Writing the metadata to the faster storage tier may accelerate read operations compared to writing metadata to a slower storage tier where the data may actually be stored.

At operation 646, the compute node 210 may write the data itself, e.g., the block(s) of data, to the selected storage tier.

At operation 648, the compute node 210 may reindex its memory cache.

Figure 7A:
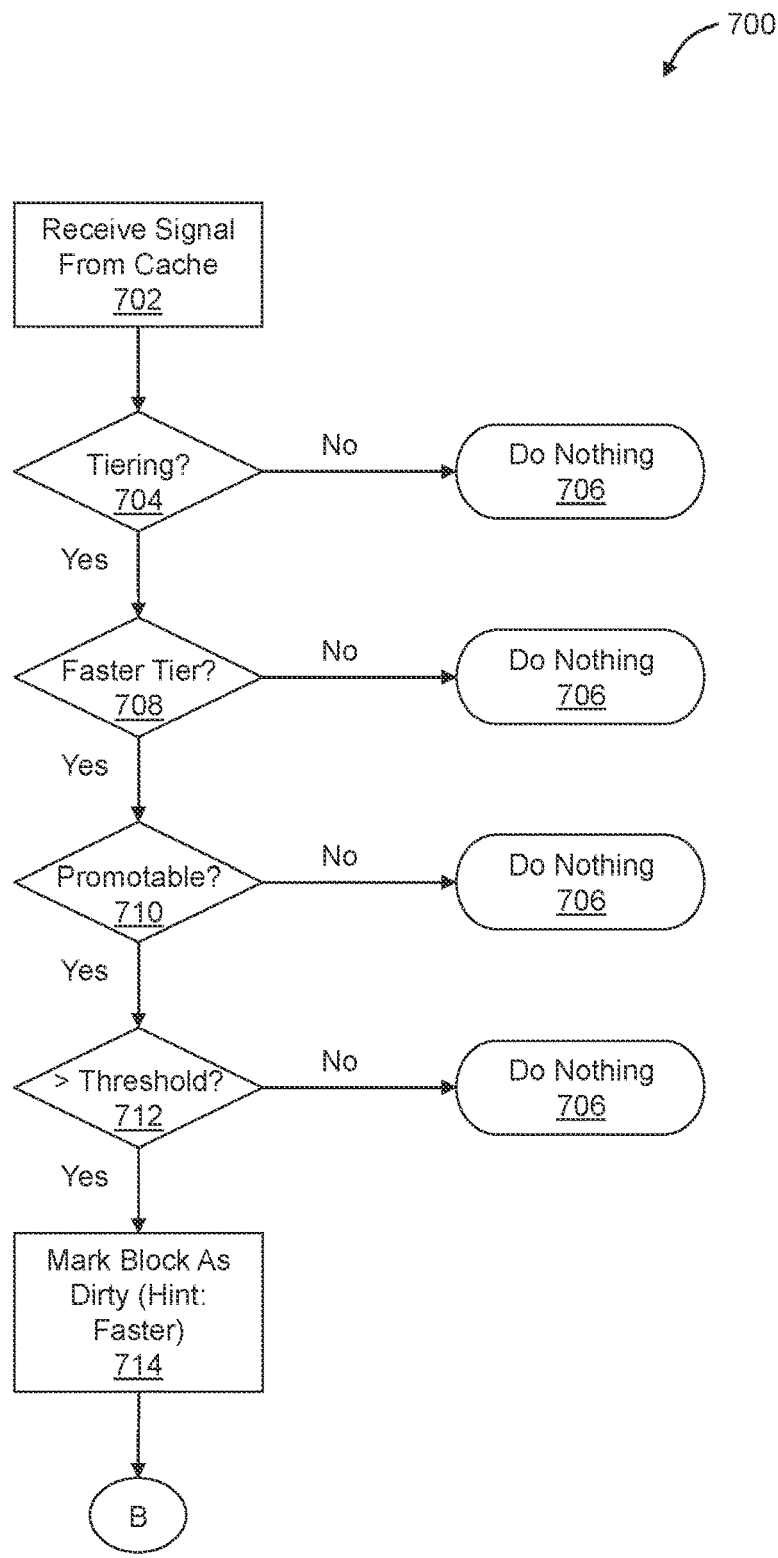
FIGS. 7A-7C are a flowchart of a method to tier or retier data on tiered storage.
Figure 7B:
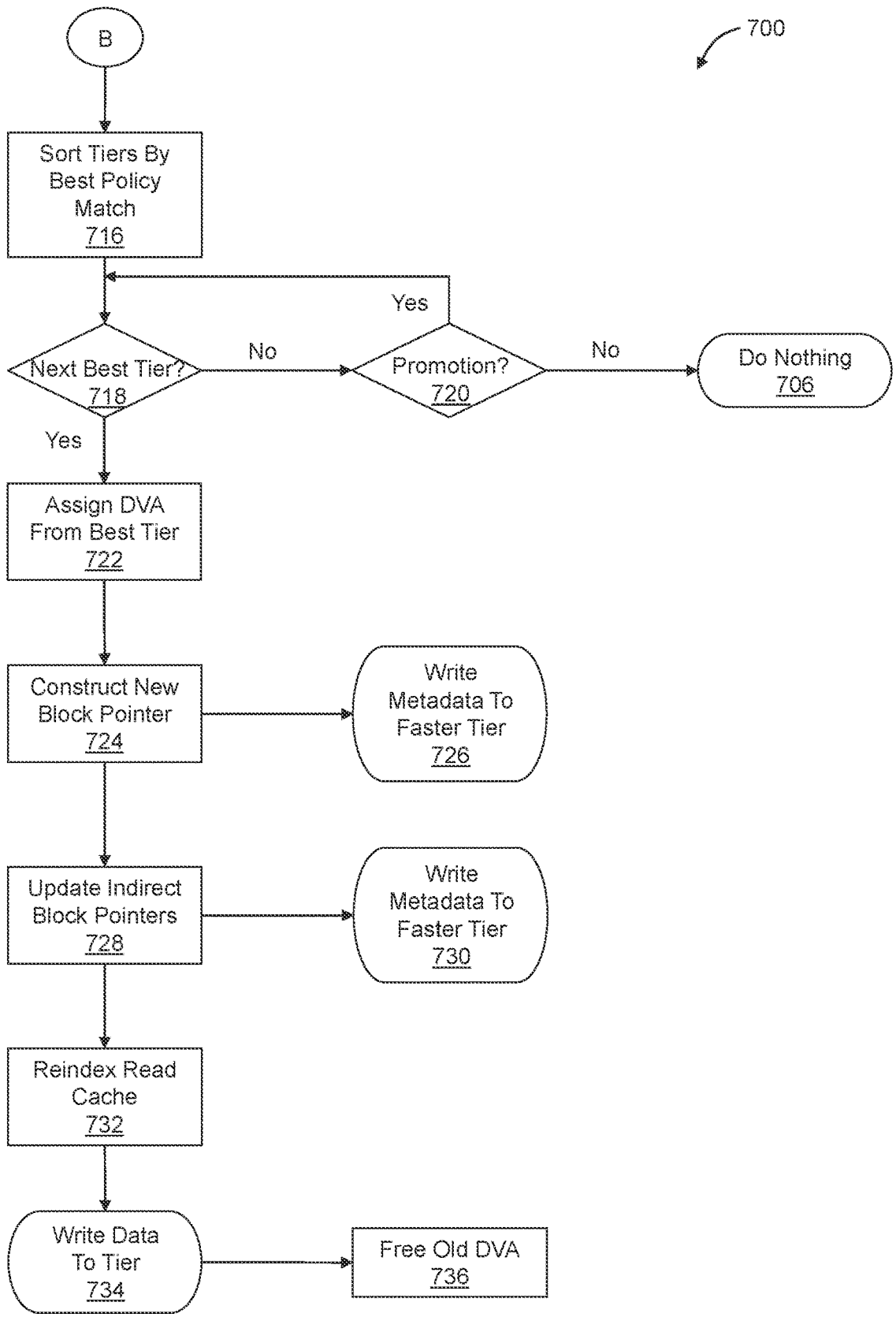
Figure 7C:
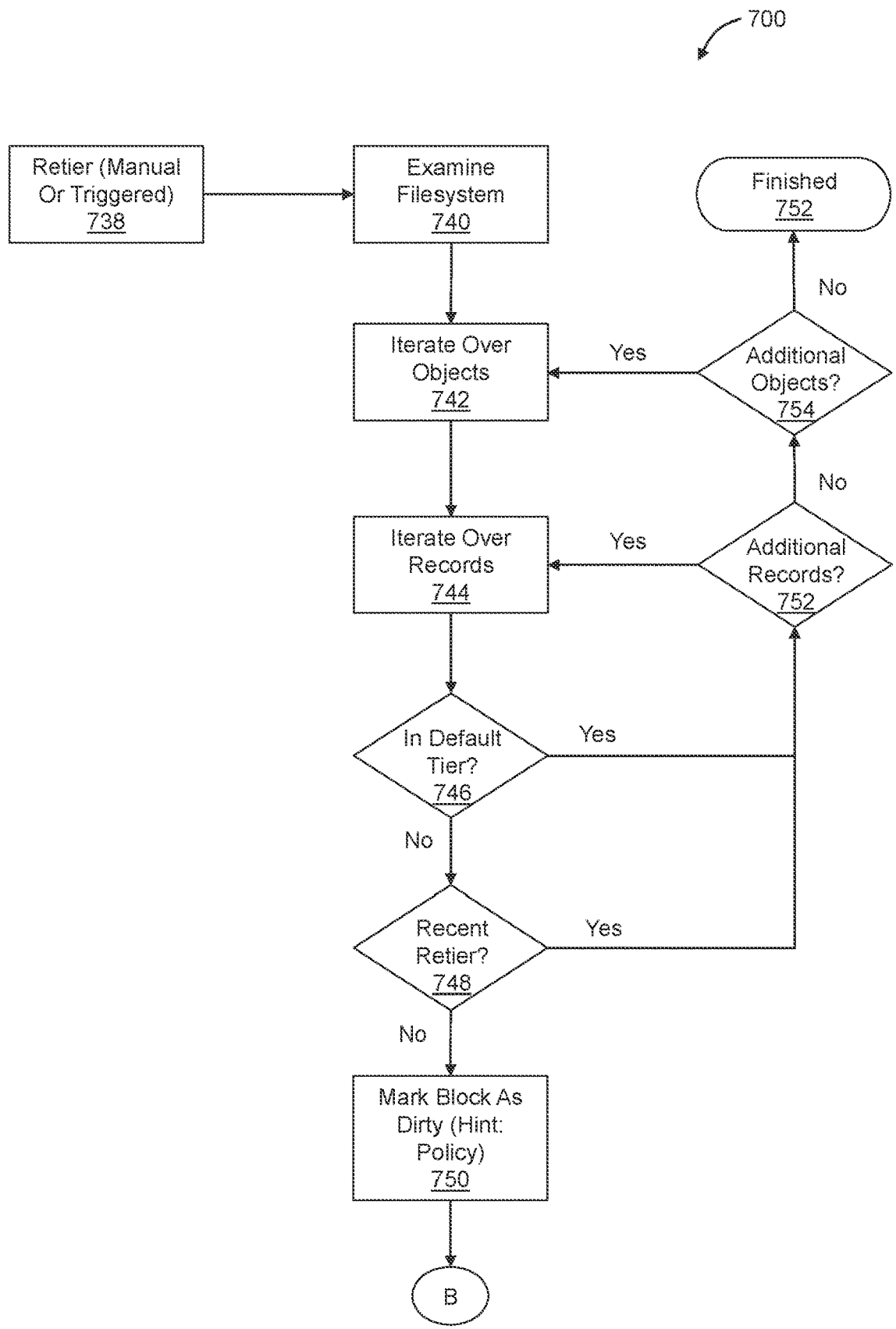

FIGS. 7A-7C are a flowchart of a method 700 to tier or retier data on tiered storage, arranged in accordance with at least one embodiment described herein. The method 700 may be programmably performed or controlled by a processor. In an example implementation, the method 700 may be performed in whole or in part by the compute node 112, 210 and/or the fabric manager 110, 208 of FIG. 1 or 2. For instance, the compute node 210 may perform the method 700 or variations thereof. The compute node 210 may include a memory or other computer-readable storage medium with computer instructions stored thereon that are executable by a processor of the compute node 210 to perform or control performance of the method 700 or variations thereof. The method 700 may include one or more of operations 702, 704, 706, 708, 710, 712, 714, 716, 718, 720, 722, 724, 726, 728, 730, 732, 734, 736, 738, 740, 742, 744, 746, 748, and/or 750. The method 700 and variations thereof may be discussed in the context of FIGS. 1 and 2.

In an example implementation, the tiering algorithm signaled at operation 510 of FIG. 5 may include one or more of the operations of FIGS. 7A and 7B. Alternatively or additionally, the retiering algorithm triggered at operation 638 in FIG. 6B may include one or more of the operations of FIGS. 7C and 7B.

Referring first to FIG. 7A, at operation 702 the compute node 210 may receive the signal initiated at operation 510 in FIG. 5 from the memory cache of the compute node 210 to implement the tiering algorithm.

At operation 704, the compute node 210 may determine whether tiering is enabled. If tiering is not enabled ("No" at operation 704), the compute node 210 may do nothing at operation 706. That is, the method 700 may end at operation 706.

If tiering is enabled ("Yes" at operation 704), the compute node 210 may determine at operation 708 whether a faster storage tier (or a storage tier with better performance level) is available for the block of data (for which the write request 536 was received at operation 502 of FIG. 5). If a faster storage tier is not available ("No" at operation 708), the compute node 210 may do nothing at operation 706.

If a faster storage tier is available ("Yes" at operation 708), the compute node 210 may determine at operation 710 whether a policy of the data store or file to which the block belongs allows promotion of the block to a faster storage tier. If the policy does not allow promotion ("No" at operation 710), the compute node 210 may do nothing at operation 706.

If the policy does allow promotion ("Yes" at operation 710), the compute node 210 may determine at operation 712 whether a hit counter of the block exceeds a threshold value. If the hit counter of the block does not exceed the threshold value ("No" at operation 712), the compute node 210 may do nothing at operation 706.

If the hit counter of the block exceeds the threshold value ("Yes" at operation 712), the compute node 210 may mark the block as dirty at operation 714 with a hint to move the block to a faster storage tier.

Referring to FIG. 7B, at operation 716, the compute node 210 may sort the storage tiers by best policy match. That is, the compute node 210 may sort the storage tiers according to how well they match a policy of the block marked dirty at operation 714 and more particularly how well they match the policy of the file or data store to which the block belongs.

At operation 718, the compute node 210 may determine whether a next best storage tier in the sorted list of storage tiers is available, that is, whether the next best storage tier has space available to store the block. If the next best storage tier is not available ("No" at operation 718), the compute node 210 may determine at operation 720 whether promotion to another tier is still possible, e.g., whether the block can be promoted to another storage tier in the sorted list of storage tiers that may have a different performance level than the one just considered but is still better than a storage tier where the block is currently located. If the promotion is not possible ("No" at operation 720), the compute node 210 may do nothing at operation 706.

If the promotion is possible ("Yes" at operation 720), the compute node 210 may loop back to operation 718 to consider a next best storage tier in the sorted list of storage tiers. Operations 718 and 720 may repeat until it is determined that a next best storage tier is available that results in a promotion for the block ("Yes" at operation 718) or until it is determined that a next best storage tier that results in a promotion for the block is not available ("No" at operations 718 and 720).

At operation 722, the compute node 210 may assign a DVA from the best available storage tier to the block. In the example of the tiering algorithm, the best available storage tier may be a storage tier that is faster than the block's current storage tier.

At operation 724, the compute node 210 may construct a block pointer for the block.

At operation 726, the compute node 210 may write metadata of the block, including the block pointer, to a faster storage tier, such as the storage tier 207A, 209A of FIG. 2. Writing the metadata to the faster storage tier may accelerate read operations compared to writing metadata to a slower storage tier where the block may actually be stored.

At operation 728, the compute node 210 may update one or more indirect block pointers 728 of the block to point to the new block pointer constructed at operation 724.

At operation 730, the compute node 210 may write metadata of the one or more indirect block pointers to the faster storage tier.

At operation 732, the compute node 210 may reindex its memory cache.

At operation 734, the compute node 210 may write the block to the storage tier whose DVA was assigned to the block at operation 722

At operation 736, the compute node 210 may free the old DVA of the block.

Referring to FIG. 7C, at operation 738 the compute node 210 may receive the signal triggered at operation 638 in FIG. 6B or triggered manually to implement the retiering algorithm.

At operation 740, the compute node 210 may examine the filesystem(s) or data store(s) on the tiered storage 206.

At operation 742, the compute node 210 may iterate over objects identified in the examination of the filesystem(s) or data store(s).

At operation 744, the compute node 210 may iterate over records within each object.

At operation 746, the compute node 210 may determine whether each block identified through operations 742 and 744 is in the default storage tier specified in the policy of the filesystem or data store to which the block belongs. If the block is not in the default storage tier ("No" at operation 746), the compute node 210 may determine at operation 748 whether the block has been retiered recently. That is, operation 748 may determine whether the block has been retiered less than a threshold period of time prior to a current time. If the block has not been retiered recently ("No" at operation 748), the compute node 210 may mark the block as dirty at operation 714 with a hint to move the block to another storage tier consistent with its policy.

If the block is in the default storage tier ("Yes" at operation 746) or has been retiered recently ("Yes" at operation 748), the compute node 210 may determine whether there are additional records at operation 752 or additional objects at operation 754 and may repeat blocks 742 and 744 until all objects and records in the filesystem or data store have been iterated over to identify all blocks for which operations 746 and/or 748 may be repeated per block. When there are no additional records ("No" at operation 752) and no additional objects ("No" at operation 754), the retiering algorithm may end.

Following operation 750 in FIG. 7C, the retiering algorithm may proceed to operation 716 in FIG. 7B where the compute node 210 may sort the storage tiers by best policy match. That is, the compute node 210 may sort the storage tiers according to how well they match a policy of the block marked dirty at operation 750 (FIG. 7C) and more particularly how well they match the policy of the file or data store to which the block belongs. When the operations of FIG. 7B are executed as part of the retiering algorithm, the compute node 210 may generally be looking to move each block under consideration to slower storage tier or storage tier with worse performance than the block's current storage tier.

Accordingly, at operation 718, the compute node 210 may determine whether a next best storage tier in the sorted list of storage tiers is available, that is, whether the next best storage tier has space available to store the block. In this example, the "best" storage tier is one that is slower than the current storage tier of the block under consideration. If the next best storage tier is not available ("No" at operation 718), the compute node 210 may determine at operation 720 whether promotion to another tier (in this case, a slower tier) is still possible, e.g., whether the block can be promoted to another storage tier in the sorted list of storage tiers that may have a different performance level than the one just considered but is still better (e.g., still slower) than block's current storage tier. If the promotion is not possible ("No" at operation 720), the compute node 210 may do nothing at operation 706.

If the promotion is possible ("Yes" at operation 720), the compute node 210 may loop back to operation 718 to consider a next best storage tier in the sorted list of storage tiers. Operations 718 and 720 may repeat until it is determined that a next best storage tier is available that results in a promotion for the block ("Yes" at operation 718) or until it is determined that a next best storage tier that results in a promotion for the block is not available ("No" at operations 718 and 720).

At operation 722, the compute node 210 may assign a DVA from the best available storage tier to the block. In the example of the retiering algorithm, the best available storage tier may be a storage tier that is slower than the block's current storage tier, such as the storage tier 207D, 209D of FIG. 2.

At operation 724, the compute node 210 may construct a block pointer for the block.

At operation 726, the compute node 210 may write metadata of the block, including the block pointer, to a faster storage tier, such as the storage tier 207A, 209A of FIG. 2. Writing the metadata to the faster storage tier may accelerate read operations compared to writing metadata to a slower storage tier where the block may actually be stored.

At operation 728, the compute node 210 may update one or more indirect block pointers 728 of the block to point to the new block pointer constructed at operation 724.

At operation 730, the compute node 210 may write metadata of the one or more indirect block pointers to the faster storage tier.

At operation 732, the compute node 210 may reindex its memory cache.

At operation 734, the compute node 210 may write the block to the slower storage tier whose DVA was assigned to the block at operation 722.

At operation 736, the compute node 210 may free the old DVA of the block.

Figure 8:
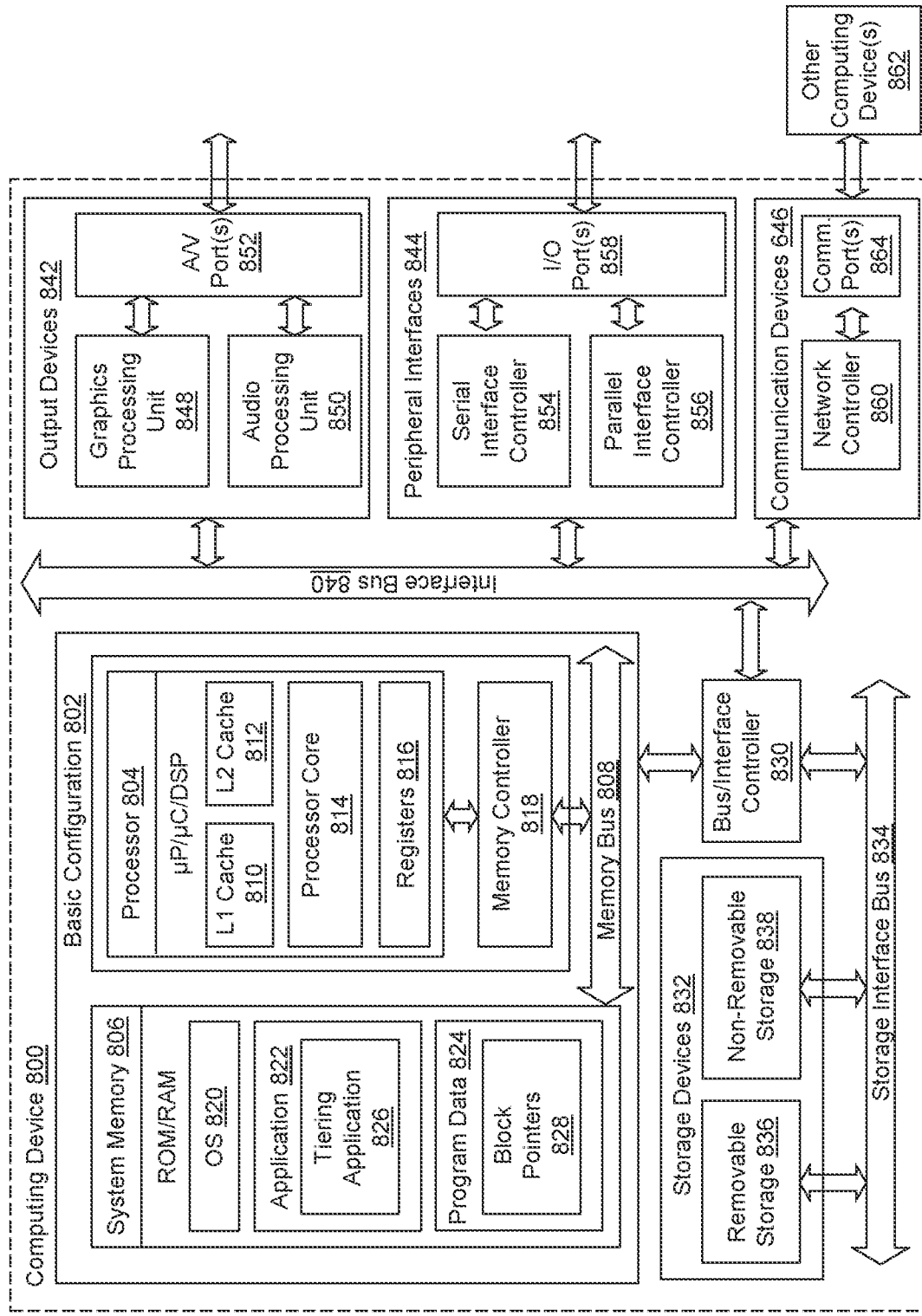
FIG. 8 is a block diagram illustrating an example computing device that is arranged to tier or retier data.

FIG. 8 is a block diagram illustrating an example computing device 800 that is arranged to tier or retier data, arranged in accordance with at least one embodiment described herein. The computing device 800 may include, be included in, or otherwise correspond to the compute node 112, 210 or to the client devices 106, 204 of FIG. 1 or 2. In a basic configuration 802, the computing device 800 typically includes one or more processors 804 and a system memory 806. A memory bus 808 may be used to communicate between the processor 804 and the system memory 806.

Depending on the desired configuration, the processor 804 may be of any type including, but not limited to, a microprocessor (µP), a microcontroller (µC), a digital signal processor (DSP), or any combination thereof. The processor 804 may include one or more levels of caching, such as a level one cache 810 and a level two cache 812, a processor core 814, and registers 816. The processor core 814 may include an arithmetic logic unit (ALU), a floating point unit (FPU), a digital signal processing core (DSP Core), or any combination thereof. An example memory controller 818 may also be used with the processor 804, or in some implementations the memory controller 818 may include an internal part of the processor 804.

Depending on the desired configuration, the system memory 806 may be of any type including volatile memory (such as RAM), nonvolatile memory (such as ROM, flash memory, etc.), or any combination thereof. The system memory 806 may include an operating system 820, one or more applications 822, and program data 824. The application 822 may include a tiering application 826 that is arranged to store, write, tier, and/or retier data, as described herein. The program data 824 may include block pointers 828 which may include, be included in, or otherwise correspond to other block pointers described herein. In some embodiments, the application 822 may be arranged to operate with the program data 824 on the operating system 820 such that one or more methods may be provided as described herein.

The computing device 800 may have additional features or functionality, and additional interfaces to facilitate communications between the basic configuration 802 and any involved devices and interfaces. For example, a bus/interface controller 830 may be used to facilitate communications between the basic configuration 802 and one or more data storage devices 832 via a storage interface bus 834. The data storage devices 832 may be removable storage devices 836, non-removable storage devices 838, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 806, the removable storage devices 836, and the non-removable storage devices 838 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 800. Any such computer storage media or non-transitory computer-readable media may be part of the computing device 800.

The computing device 800 may also include an interface bus 840 to facilitate communication from various interface devices (e.g., output devices 842, peripheral interfaces 844, and communication devices 846) to the basic configuration 802 via the bus/interface controller 830. The output devices 842 include a graphics processing unit 848 and an audio processing unit 850, which may be configured to communicate to various external devices such as a display or speakers via one or more A/V ports 852. Diagrams, flowcharts, organizational charts, connectors, and/or other graphical objects generated by the diagram application 826 may be output through the graphics processing unit 848 to such a display. The peripheral interfaces 844 include a serial interface controller 854 or a parallel interface controller 856, which may be configured to communicate with external devices such as input devices (e.g., keyboard, mouse, pen, voice input device, touch input device, etc.), sensors, or other peripheral devices (e.g., printer, scanner, etc.) via one or more I/O ports 858. Such input devices may be operated by a user to provide input to the diagram application 826, which input may be effective to, e.g., generate curved connectors, designate points as designated points of one or more curved connectors, relocate one or more designated points, and/or to accomplish other operations within the diagram application 826. The communication devices 846 include a network controller 860, which may be arranged to facilitate communications with one or more other computing devices 882 over a network communication link via one or more communication ports 884.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 800 may be implemented as a portion of a small-form factor portable (or mobile) electronic device such as a smartphone, a personal data assistant (PDA) or an application-specific device. The computing device 800 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to store data in a tiered storage, the method comprising:
   receiving a plurality of policies for a plurality of data sets to be stored on the tiered storage,
   the tiered storage comprising a plurality of storage tiers, each storage tier of the plurality of storage tiers having a different performance level, each policy defining a default storage tier of the plurality of storage tiers for the corresponding data set, a first policy being specific to a first data set;
   initially storing the plurality of data sets on the tiered storage as a plurality of blocks, each of the plurality of blocks stored to a corresponding one of the plurality of storage tiers of the tiered storage based on the policy of the data set to which the block belongs, the first data set initially being stored on the tiered storage according to the first policy;
   periodically monitoring the tiered storage for a triggering event to relocate a block of the first data set within the tiered storage, wherein periodically monitoring the tiered storage for the triggering event includes determining whether the block of the first data set is in a default storage tier specified in the first policy, the triggering event including a determination that the block of the first data set is not in the default storage tier specified in the first policy,
   generating statistics of at least some of the plurality of blocks, the statistics of each block including at least one of a last access time or a level of activity of the block;
   sorting a list of the plurality of storage tiers of the tiered storage according to how well each storage tier matches the first policy; and
   responsive to detecting the triggering event,
   selecting a particular storage tier of the plurality of storage tiers from the sorted list of plurality of storage tiers based on a best match of the particular storage tier to the first policy;
   relocating the block of the first data set to the selected particular storage tier within the tiered storage; and
   moving, asynchronously, one or more blocks of the at least some of the plurality of blocks between storage tiers of the plurality of storage tiers based on at least one of the statistics of each of the one or more blocks and a corresponding policy of a corresponding data set to which each of the one or more blocks belongs.

2. The method of claim 1, wherein storing the plurality of data sets on the tiered storage as the plurality of blocks includes storing a plurality of block pointers on the tiered storage, each of the plurality of block pointers pointing to a location in the tiered storage of a different one of the plurality of blocks.

3. The method of claim 2, wherein monitoring the tiered storage for the triggering event to relocate the block of the first data set within the tiered storage includes:
   identifying a first block of the plurality of blocks to be moved from a first location on a first storage tier of the plurality of storage tiers to a second location on a second storage tier of the plurality of storage tiers; and
   replacing a first block pointer of the first block that points to the first location with a second block pointer that points to the second location, wherein relocating the block of the first data set includes moving the first block from the first location on the first storage tier to the second location on the second storage tier.

4. The method of claim 1, wherein each policy further defines one or more overflow storage tiers.

5. The method of claim 4, wherein:
   the first policy of the first data set defines a first storage tier as the default storage tier for the first data set;
   a second policy of a second data set defines a second storage tier as the default storage tier for the second data set and the first storage tier as the overflow storage tier for the second data set, the first storage tier having a better or worse performance level than the second storage tier;
   storing the plurality of data sets on the tiered storage as the plurality of blocks based at least on the policy of each data set comprises:
   storing blocks of the first data set on the first storage tier according to the first policy; and
   storing blocks of the second data set on the second storage tier according to the second policy;
   the method further comprising:
   determining that the first storage tier has unused capacity; and
   relocating at least some blocks of the second data set from the second storage tier to the first storage tier.

6. The method of claim 1 wherein:
   generating the statistics comprises generating the statistics in real time or near real time.

7. The method of claim 1, wherein:
   generating the statistics comprises incrementing a hit counter of each of the one or more blocks in a memory cache each time the corresponding block is read or written; and moving one or more blocks of the at least some of the plurality of blocks between storage tiers of the plurality of storage tiers based on at least one of the statistics of each of the one or more blocks or the corresponding policy comprises moving the corresponding block in response to the hit counter of the corresponding block exceeding a threshold value, the triggering event relating to the hit counter of the corresponding block exceeding the threshold value.

8. The method of claim 1, wherein the plurality of data sets includes a first data set and wherein storing the plurality of data sets on the tiered storage as the plurality of blocks comprises storing a first block of the first data set on a first storage tier of the plurality of storage tiers and storing a second block of the first data set on a second storage tier of the plurality of storage tiers that is different than the first storage tier.

9. A non-transitory computer-readable storage medium comprising computer-readable instructions stored thereon that are executable by a processor to perform or control performance of operations comprising:
receiving a plurality of policies for a plurality of data sets to be stored on tiered storage, the tiered storage comprising a plurality of storage tiers, each storage tier of the plurality of storage tiers having a different performance level, each policy defining a default storage tier of the plurality of storage tiers for the corresponding data set that has the policy, a first policy corresponding to a first data set, a second policy corresponding to a second data set, the first policy being different than the second policy;
storing the plurality of data sets on the tiered storage as a plurality of blocks, each of the plurality of blocks stored to a corresponding one of the plurality of storage tiers of the tiered storage based at least on the policy of the data set to which the block belongs;
monitoring the tiered storage for a triggering event to relocate a data block of the first data set within the tiered storage, the triggering event including a determination that the first policy is not satisfied; and
responsive to identifying the triggering event, relocating the data block of the first data set within the tiered storage in view of the first policy for the first data set and in view of a third policy that is associated with the tiered storage,
wherein monitoring the tiered storage for the triggering event includes:
determining that the block of the first data set has been retired more than a threshold period of time prior to a current time; and
marking the block as a candidate to move the block to another storage tier consistent with the first policy.

10. A method to retier data in a tiered storage, the method comprising:
storing a plurality of data sets on the tiered storage as a plurality of blocks according to a plurality of policies including at least one data set policy and at least one data store policy, the tiered storage comprising a plurality of storage tiers each having a different performance level, a first policy being a data set policy corresponding to a first data set, a second policy being a data store policy corresponding to the tiered storage, the first policy being different than the second policy;
periodically generating statistics of at least some of the plurality of blocks, the statistics of each block including at least one of a last access time or activity level of the block;
each time the statistics are generated or updated for a first block, determining whether to move the first block within the tiered storage; and
responsive to the generation or update of the statistics for the first block, moving the first block of the at least some of the plurality of blocks between storage tiers of the plurality of storage tiers based on at least one of the statistics of the first block or a first policy of a first data set to which the first block belongs, and based on the second policy of the plurality of policies permitting the movement of the first block within the tiered storage based on a determination of an amount of free space for at least one storage tier of the plurality of storage tiers or a determination of a level of activity within the tiered storage, wherein monitoring the tiered storage for the triggering event includes:
determining that the block of the first data set has been retired more than a threshold period of time prior to a current time; and
marking the block as a candidate to move the block to another storage tier consistent with the first policy.

11. The method of claim 10, wherein:
generating the statistics comprises generating the statistics as the first block is read or written; and
moving the first block comprises moving the first block as the first block is read or written.

12. The method of claim 10, wherein:
generating the statistics comprises incrementing a hit counter of the first block in a memory cache each time the first block is read or written; and
moving the first block between storage tiers of the plurality of storage tiers based on at least one of the statistics of the first block or the first policy of the first data set to which the first block belongs comprises moving the first block in response to the hit counter exceeding a threshold value.

13. The method of claim 10, wherein storing the plurality of data sets on the tiered storage as the plurality of blocks includes storing a plurality of block pointers on the tiered storage, each of the plurality of block pointers pointing to a location in the tiered storage of a different one of the plurality of blocks.

14. The method of claim 10, wherein moving the first block between storage tiers based on at least one of the statistics of the first block or the first policy comprises moving the first block from a first storage tier to a second storage tier with a better performance level in response to the statistics indicating the first block is busy and the first policy permitting movement to the second storage tier.

15. The method of claim 10, further comprising moving a second block of the plurality of blocks from a first storage tier to a second storage tier with a worse performance level in response to statistics of the second block indicating the second block was last accessed more than a threshold time ago and the corresponding policy permitting movement to the second storage tier.

16. The method of claim 10, further comprising, after moving the first block from a first location on a first storage tier of the plurality of storage tiers to a second location on a second storage tier of the plurality of storage tiers, queuing the first location to become free space.

17. The method of claim 10, wherein moving the first block between storage tiers comprises moving the first block from a first storage tier to a second storage tier with a better performance level, the method further comprising, prior to moving the first block from the first storage tier to the second storage tier:

determining that the second storage tier has free space;
determining that the first policy of the first data set to which the first block belongs allows promotion of blocks of the first data set to the second storage tier; and
determining that a hit counter that indicates an activity level of the first block exceeds a threshold value.

18. A non-transitory computer-readable storage medium comprising computer-readable instructions stored thereon that are executable by a processor to perform or control performance of operations comprising:
receive a plurality of policies for a plurality of data sets to be stored on tiered storage, the tiered storage comprising a plurality of storage tiers, each storage tier of the plurality of storage tiers having a different performance level, each policy defining a default storage tier of the plurality of storage tiers for the corresponding data set that has the policy, a first policy corresponding to a first data set, a second policy corresponding to a second data set, the first policy being different than the second policy;
store the plurality of data sets on the tiered storage as a plurality of blocks, each of the plurality of blocks stored to a corresponding one of the plurality of storage tiers of the tiered storage based at least on the policy of the data set to which the block belongs and based on a policy of the tiered storage;
responsive to an occurrence of a triggering event, move a first block of the plurality of blocks to a storage tier other than the respective default storage tier for the first block, the first block being moved based on at least two policies of the plurality of policies and including the policy of the tiered storage,
generating statistics of at least some of the plurality of blocks, the statistics of each block including at least one of a last access time or a level of activity of the block; and
moving, asynchronously, one or more blocks of the at least some of the plurality of blocks between storage tiers of the plurality of storage tiers based on at least one of the statistics of each of the one or more blocks and a corresponding policy of a corresponding data set to which each of the one or more blocks belongs, the moving of the one or more blocks being based on a best match for a storage tier with respect to the first policy.

* * * * *